March 24, 1959　　　R. G. JONES　　　2,879,042
AUTOMATIC AMALGAMATOR
Filed July 17, 1957　　　　　　　　　　2 Sheets-Sheet 1

Robert G. Jones
INVENTOR.

March 24, 1959 — R. G. JONES — 2,879,042
AUTOMATIC AMALGAMATOR
Filed July 17, 1957 — 2 Sheets-Sheet 2
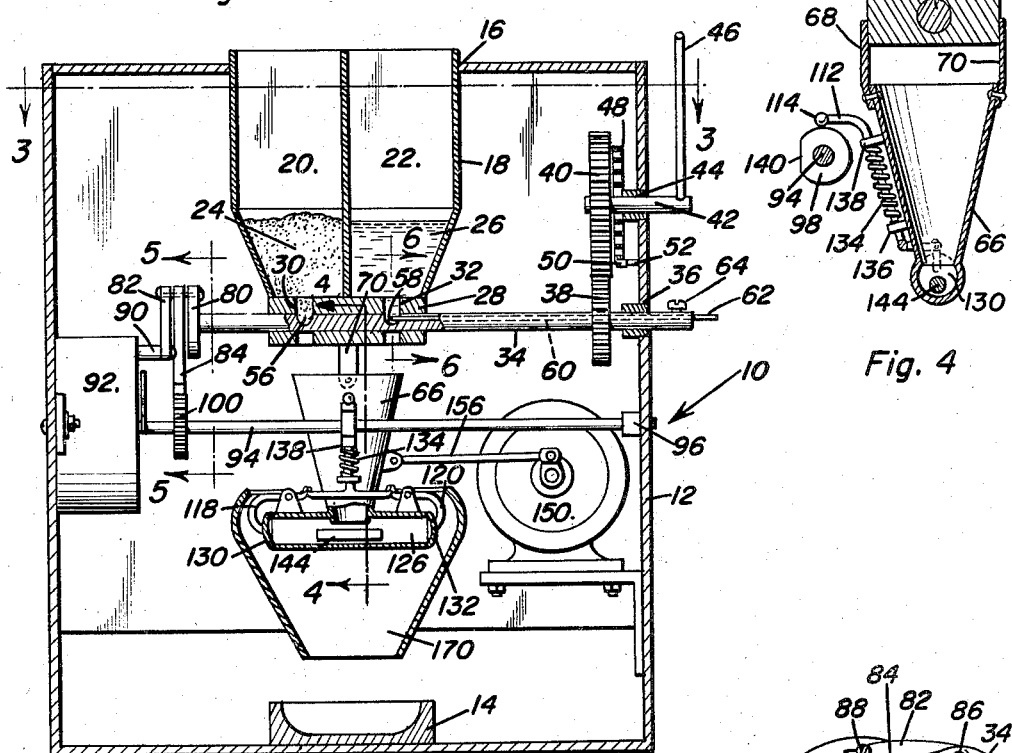
Fig. 2
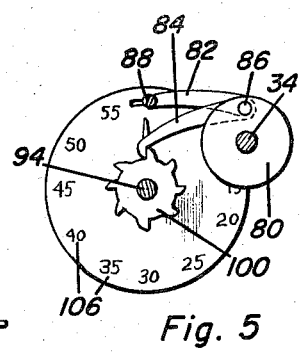
Fig. 4
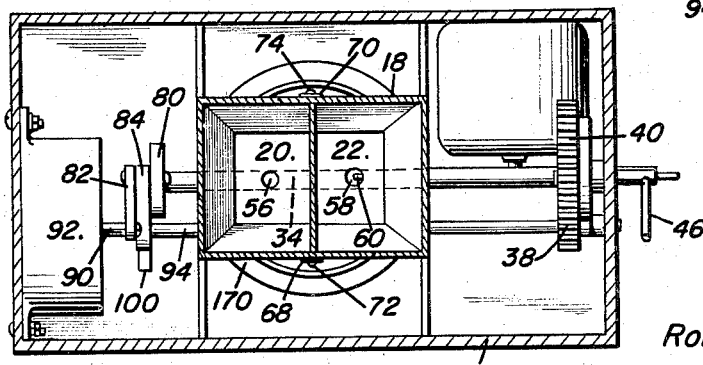
Fig. 3
Fig. 5
Robert G. Jones
INVENTOR.
BY Clarence A. O'Brien
and Harvey B. Jacobson
Attorneys

United States Patent Office 2,879,042
Patented Mar. 24, 1959

2,879,042

AUTOMATIC AMALGAMATOR

Robert G. Jones, Tulsa, Okla.

Application July 17, 1957, Serial No. 672,421

7 Claims. (Cl. 259—2)

This invention relates to a mixing device and more particularly to a device for proportionally mixing dental alloys and the like.

The primary object of the present invention resides in the provision of means for storing proportionally metering, and time mixing two or more materials such as silver alloy and mercury as used in dental work and to deliver the alloy after mixing in a convenient manner for further use.

A further object of the present invention resides in the provision of a proportional mixing device which is capable of mixing any suitable number of units of material in a predetermined proportion and which includes means for varying the proportions of materials to be mixed as desired.

The construction of this invention features the use of a novel metering bar which is connected in such a manner as to not only control the timer but the drive means but which will also control the operation of the timer and the position of the cam means employed for opening and closing the mixing capsule utilized in the invention.

Still further objects and features of this invention reside in the provision of a device of the nature disclosed that is simple in construction, relatively small and portable, highly efficient in use, and relatively inexpensive to manufacture thereby permitting wide distribution.

These, together with the various ancillary objects and features of the invention which will become apparent as the following description proceeds, are attained by this proportional mixing device, a preferred embodiment of which has been illustrated in the accompanying drawings, by way of example only, wherein:

Figure 2 is a vertical sectional view of the device comprising the present invention shown mounted in the casing provided therefor;

Figure 3 is a horizontal sectional view of the device as taken along the plane of line 3—3 in Figure 2 illustrating particularly the relative arrangement of the metering rod and the operating means therefor;

Figure 4 is an enlarged sectional detail view as taken along the plane of line 4—4 in Figure 2 illustrating in particular the construction of the funnel and associated mixing capsule together with the means for operating the covers of the mixing capsule;

Figure 5 is a vertical sectional detail view as taken along the plane of line 5—5 in Figure 2 illustrating in particular the actuating means and timer control means connected to the metering rod.

Figures 1, 6:
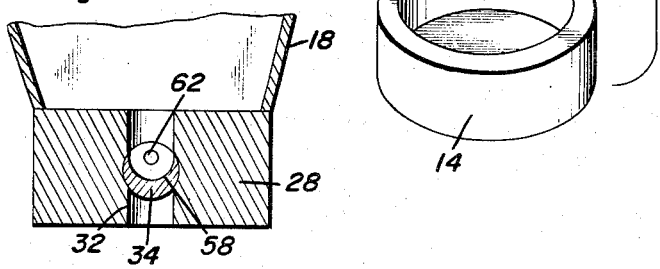
Figure 1 is a perspective view of the major operating components of the invention.
Figure 6 is a sectional detail view in an enlarged scale as taken along the plane of line 6—6 in Figure 2 illustrating particularly the construction of the metering rod.

With continuing reference to the accompanying drawings wherein like reference numerals designate similar parts throughout the various views, reference numeral 10 generally designates the device comprising the present invention which includes a housing 12 of any suitable configuration and which has a receptacle 14 disposed in the housing which receptacle 14 may be a cloth or container as desired and into which the thoroughly mixed materials are to be deposited. An access opening in the housing 12 may be provided and the receptacle 14 may be mounted on a tray, not shown, if such is desired.

Mounted in the housing 12 in an opening as at 16 is a hopper 18 of any suitable shape having a plurality of compartments 20 and 22 therein into which different materials such as silver alloy 24 and mercury 26 may be deposed and stored. The hopper 18 has a delivery bar 28 having a pair of openings 30 and 32 therethrough which openings would normally permit gravity to cause the material in the hoppers to be fed therethrough.

Disposed in the bar 28 and rotatably mounted therein is a metering rod 34 which is also supported by a bearing or the like 36 mounted on the housing 12. This rod 36 has a gear 38 fixed thereto which gear is engaged by a gear 40 mounted on a handle shaft 42 which is journaled as at 44 in the housing 12 and which extends through the housing. A handle 46 is mounted on the handle shaft 42 and spring return means 48 are provided for the shaft 42, handle 46 and gear 40. Thus, actuation of the handle 46 will cause the gear 40 to be rotated rotating the gear 38 and associated gearing rod 34. A stop pin 50 is mounted on the gear 40 and is engageable with a lug 52 on the housing for returning the gear 40 to an initial position without completely unwinding the spring 48.

The metering bar 36 is provided with a pair of pockets 56 and 58 therein and has a bore 60 extending therethrough into which a stick 62 may be adjustably positioned and locked in place by means of a setscrew 64 which is threadedly engaged with the metering rod 34 and with the stick 62. This adjusting stick 62 therefore may be used to control the volume of the pocket hence the amount of material that may be disposed in the pocket 58.

As is quite apparent, rotation of the metering rod 34 will cause material received in the pocket when in the raised position as is shown in Figure 2 to be disposed through the openings 30 and 32 into a funnel 66 pivotally suspended by a pair of brackets 68 and 70 from the hopper which brackets are pinned as at 72 and 74 to the funnel 66. Mounted on the metering rod 34 is a disk 80 having arms 82 and 84 pivoted thereto as at 86 by means of a pin or pins. The arm 82 is connected by means of a fastener 88 in a pivotal manner to an actuator 90 for a timer 92. The actuator 90 serves the purpose of an on, off switch for the timer 92.

The shaft 94 is driven by the timer 92, and rotation thereof by an external source will serve to set the timer. This shaft 94 is journaled as at 96 in the housing 12 and has a cam 98 mounted thereon as well as a gear 100 which cooperates with the pawl-like end 102 of the arm 84.

An indicator 104 is also mounted on the shaft 94 and cooperates with indicia 106 on the face of the timer 92. The timer 92 is preferably of conventional construction.

Slidably mounted by means of brackets 110 on the funnel 66 is a cam follower and linkage 112 including a cam follower 114 which is engageable with the cam 98. Cam 98 is sufficiently wide to prevent follower 114 from sliding laterally off the cam surface during the operation of the cam and linkage 112. The cam follower linkage 112 further includes an arcuate portion 116 to which links 118 and 120 are pivotally attached, the links being fulcrumed as at 122 and 124 carried by ears attached to a mixing capsule 126 suspended from and carried by the funnel 66. Attached to the free ends of the links 118 and 120 are caps or covers 130 and 132 for the open ends of the capsule 126. A baffle forming funnel 170 is disposed around capsule 126 to catch and gather mixed material as it is thrown from capsule 126 when caps 130 and 132 are open so that the material falls by gravity into receptacle 14. A spring 134 is positioned concentrically about the shank portion of the linkage 112 and normally urges the linkage downwardly to pivot the caps 130 and 132 outwardly a small distance thus opening the capsule 126. The spring 134 engages a stop 136 on the linkage 114 and also engages a lug or bracket 138 in the funnel. The cam follower 114 when it engages the raised surfaces of the cam will therefore cause the caps 130 and 132 to be closed. However, when the cam follower engages the flattened portion as at 140 of the cam 98 the spring 134 will be allowed to exert its stored energy to open the caps 130 and 132.

The mixing capsule 126 is so disposed with respect to the funnel that the contents thereof will not readily turn upwardly into the funnel 66 due to the extension of the funnel somewhat down into the mixing capsule. Further, a cylinder 144 of any suitable material such as metals, plastics or the like is disposable within the capsule 126 for thoroughly aiding in the agitation of the contents of the mixing capsule 126. The covers 130 and 132 will not normally open far enough to permit the cylinder 144 to fall out of the mixing capsule. In order to agitate the funnel and the mixing capsule, there is provided a motor 150 which drives a shaft 152 having a crank 154 mounted thereon. A pitman or connecting rod 156 is pivoted to the crank 154 as at 158 and to lugs 160 on the funnel 66 as at 162.

The operation of this automatic amalgamator is as follows. After a laboratory technician or dentist determines how much of the amalgam is necessary for a particular operation, the handle 46 is actuated for a distance of about 60°. This is done because of the gear ratio will serve to rotate the metering rod 34 sufficiently to deposit materials into the mixing chamber through the funnel 66. A given increment of time for each load dispensed by metering rod 34 may be selected by adjusting timer 92. This is achieved by arm 84 on gear 100. Handle 46 may be rotated a greater amount than 60°, for example 10 additional degrees, which will cause the arm 82 to operate the timer actuator. Accordingly, the timer, which is connected, for instance by line cord 151, to an electric source and to motor 150 by cable 153, will energize motor 150 and in the prescribed increment of time that is already placed on the timer 92. The timer will rotate cam 94 counter-clockwise until the cam follower 114 comes on the cam flat 140 thereby opening the capsule covers 130 and 132 and allowing the mixed material to be thrown out against funnel 170 and fall by gravity into receptacle 14 where it can be recovered.

Thus, the timer can be set to determine the period of how long the motor 150 will run and how long before the cam follower will engage the cam surface 140 on the cam 98 to open the covers 130 and 132. The motor will oscillate the mixing capsule 128 even after the covers 130 and 132 have been opened due to the action of the cam follower and the cam thereby permitting the mixed amalgam to be shaken out of the mixing capsule.

It is noted that the amount of mercury with respect to the silver alloy when using the invention to produce amalgam may be varied through the use of the adjusting stick 62, which will vary the capacity of the pocket 32 as desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A proportional mixing device comprising a hopper having a plurality of separate storage compartments having separate gravity feed delivery openings, a metering bar rotatably disposed in said hopper and extending therethrough, said metering bar being in alignment with said openings closing said openings, said metering bar having pockets therein for receiving material from said hopper and for discharging the material received in said pockets through said openings upon rotation of said metering bar, a funnel communicating with said openings pivoted to said hopper, a mixing capsule suspended from said funnel for receiving material from said opening through said funnel, drive means for agitating said mixing capsule secured thereto, a baffle disposed about said mixing capsule, said mixing capsule having open ends closed by covers, a cover closing linkage carried by said funnel connected to said covers, spring means engaging said funnel and said linkage for urging said linkage to a position opening said covers, a shaft, means for rotating said shaft in response to rotation of said metering rod connected to said shaft and said metering rod, a cam on said shaft, and a cam follower on said linkage engaging said cam, said cam having a raised portion for holding said cam follower and hence said linkage in a position stressing said spring and closing said covers.

2. A proportional mixing machine comprising a hopper having a plurality of compartments, a funnel pivoted to said hopper, a metering bar rotatably mounted in said hopper for metering material from said hopper to said funnel, a mixing capsule suspended from said funnel for receiving material from said opening through said funnel, drive means for agitating said mixing capsule secured thereto, a baffle disposed about said mixing capsule, said mixing capsule having open ends closed by covers, a cover closing linkage carried by said funnel connected to said covers, spring means engaging said funnel and said linkage for urging said linkage to a position opening said covers, a shaft, means for rotating said shaft in response to rotation of said metering rod connected to said shaft and said metering rod, a cam on said shaft, and a cam follower on said linkage engaging said cam, said cam having a raised portion for holding said cam follower and hence said linkage in a position stressing said spring and closing said covers.

3. A proportional mixing machine comprising a hopper having a plurality of compartments, a funnel pivoted to said hopper, a metering bar rotatably mounted in said hopper for metering material from said hopper to said funnel, a mixing capsule suspended from said funnel for receiving material from said opening through said funnel, drive means for agitating said mixing capsule secured thereto, a baffle disposed about said mixing capsule, said mixing capsule having open ends closed by covers, a cover closing linkage carried by said funnel connected to said covers, spring means engaging said funnel and said linkage for urging said linkage to a position opening said covers, a shaft, means for rotating said shaft in response to rotation of said metering rod connected to said shaft and said metering rod, a cam on said shaft, a cam follower on said linkage engaging said cam, said cam having a raised portion for holding said cam follower and hence said linkage in a position stressing said spring and closing said covers, and a timer controlling said drive means, said timer including timer setting means, said shaft being connected to said timer and said timer setting means so that rotation of said shaft will set said timer and said timer will rotate said shaft.

4. A proportional mixing machine comprising a hopper having a plurality of compartments, a funnel pivoted to said hopper, a metering bar rotatably mounted in said hopper for metering material from said hopper to said funnel, a mixing capsule suspended from said funnel for receiving material from said opening through said funnel, drive means for agitating said mixing capsule secured thereto, a baffle disposed about said mixing capsule, said mixing capsule having open ends closed by covers, a cover closing linkage carried by said funnel connected to said covers, spring means engaging said funnel and said linkage for urging said linkage to a position opening said covers, a shaft, means for rotating said shaft in response to rotation of said metering rod connected to said shaft and said metering rod, a cam on said shaft, a cam follower on said linkage engaging said cam, said cam having a raised portion for holding said cam follower and hence said linkage in a position stressing said spring and closing said covers, a timer controlling said drive means, said timer including timer setting means, said shaft being connected to said timer and said timer setting means so that rotation of said shaft will set said timer and said timer will rotate said shaft, a timer actuating mechanism, and means interconnecting said timer actuating mechanism and said metering rod.

5. A proportional mixing device comprising a hopper having a plurality of separate storage compartments having separate gravity feed delivery openings, a metering bar rotatably disposed in said hopper and extending therethrough, said metering bar being in alignment with said openings closing said openings, said metering bar having pockets therein for receiving material from said hopper and for discharging the material received in said pockets through said openings upon rotation of said metering bar, a funnel communicating with said openings pivoted to said hopper, a mixing capsule suspended from said funnel for receiving material from said opening through said funnel, drive means for agitating said mixing capsule secured thereto, a baffle disposed about said mixing capsule, said mixing capsule having open ends closed by covers, a cover closing linkage carried by said funnel connected to said covers, spring means engaging said funnel and said linkage for urging said linkage to a position opening said covers, a shaft, means for rotating said shaft in response to rotation of said metering rod connected to said shaft and said metering rod, a cam on said shaft, a cam follower on said linkage engaging said cam, said cam having a raised portion for holding said cam follower and hence said linkage in a position stressing said spring and closing said covers, said metering rod having a bore therein communicating with one of said pockets, an adjusting stick disposed in said bore movable into said one of said pockets, and means for holding said stick in place engaged with said metering rod and engaging said stick.

6. A proportional mixing device comprising a hopper having a plurality of separate storage compartments having separate gravity feed delivery openings, a metering bar rotatably disposed in said hopper and extending therethrough, said metering bar being in alignment with said openings closing said openings, said metering bar having pockets therein for receiving material from said hopper and for discharging the material received in said pockets through said openings upon rotation of said metering bar, a funnel communicating with said openings pivoted to said hopper, a mixing capsule suspended from said funnel for receiving material from said opening through said funnel, drive means for agitating said mixing capsule secured thereto, a baffle disposed about said mixing capsule, said mixing capsule having open ends closed by covers, a cover closing linkage carried by said funnel connected to said covers, spring means engaging said funnel and said linkage for urging said linkage to a position opening said covers, a shaft, means for rotating said shaft in response to rotation of said metering rod connected to said shaft and said metering rod, a cam on said shaft, a cam follower on said linkage engaging said cam, said cam having a raised portion for holding said cam follower and hence said linkage in a position stressing said spring and closing said covers, and a timer controlling said drive means, said timer including timer setting means, said shaft being connected to said timer and said timer setting means so that rotation of said shaft will set said timer and said timer will rotate said shaft.

7. A proportional mixing device comprising a hopper having a plurality of separate storage compartments having separate gravity feed delivery openings, a metering bar rotatably disposed in said hopper and extending therethrough, said metering bar being in alignment with said openings closing said openings, said metering bar having pockets therein for receiving material from said hopper and for discharging the material received in said pockets through said openings upon rotation of said metering bar, a funnel communicating with said openings pivoted to said hopper, a mixing capsule suspended from said funnel for receiving material from said opening through said funnel, drive means for agitating said mixing capsule secured thereto, a baffle disposed about said mixing capsule, said mixing capsule having open ends closed by covers, a cover closing linkage carried by said funnel connected to said covers, spring means engaging said funnel and said linkage for urging said linkage to a position opening said covers, a shaft, means for rotating said shaft in response to rotation of said metering rod connected to said shaft and said metering rod, a cam on said shaft, a cam follower on said linkage engaging said cam, said cam having a raised portion for holding said cam follower and hence said linkage in a position stressing said spring and closing said covers, said metering rod having a bore therein communicating with one of said pockets, an adjusting stick disposed in said bore movable into said one of said pockets, means for holding said stick in place engaged with said metering rod and engaging said stick, a timer actuating mechanism, means interconnecting said timer actuating mechanism and said metering rod, and a timer controlling said drive means, said timer including timer setting means, said shaft being connected to said timer and said timer setting means so that rotation of said shaft will set said timer and said timer will rotate said shaft.

References Cited in the file of this patent

UNITED STATES PATENTS

| | | |
|---|---|---|
| 1,456,526 | Wright | May 29, 1923 |
| 2,541,043 | Curry | Feb. 13, 1951 |
| 2,782,012 | Coyne et al. | Feb. 19, 1957 |